US008522941B1

(12) United States Patent
Eldessouky (10) Patent No.: US 8,522,941 B1
(45) Date of Patent: Sep. 3, 2013

(54) SPLIT-SHAFT CLUTCHING ARRANGEMENT OF A POSITIVE FEED DRILL

(76) Inventor: Ahmed Eldessouky, Anaheim Hills, CA (US)

(*) Notice: Subject to any disclaimer, the term of this patent is extended or adjusted under 35 U.S.C. 154(b) by 636 days.

(21) Appl. No.: 12/703,627

(22) Filed: Feb. 10, 2010
(Under 37 CFR 1.47)

Related U.S. Application Data

(60) Provisional application No. 61/155,412, filed on Feb. 25, 2009.

(51) Int. Cl.
*F16D 13/22* (2006.01)
*F16D 11/10* (2006.01)

(52) U.S. Cl.
USPC ........................................ 192/69.81

(58) Field of Classification Search
USPC ............ 192/69.8, 69.81, 69.82, 69.83, 85.15, 192/85.42, 48.8, 48.9, 18 A; 408/132, 139, 408/138, 141, 137
See application file for complete search history.

(56) References Cited

U.S. PATENT DOCUMENTS

| 3,740,146 | A  | * | 6/1973  | Wilharm ..................... 352/91 C |
| 4,418,767 | A  | * | 12/1983 | Vindez ............................ 173/19 |
| 4,591,299 | A  | * | 5/1986  | Eckman ...................... 408/1 R |
| 5,143,161 | A  | * | 9/1992  | Vindez ............................ 173/19 |
| 5,351,797 | A  | * | 10/1994 | Lawson et al. ................ 192/141 |
| 6,193,447 | B1 | * | 2/2001  | Thames et al. ............... 408/1 R |
| 6,261,033 | B1 | * | 7/2001  | Thames et al. ............... 408/1 R |
| 7,086,254 | B2 | * | 8/2006  | Lim et al. ..................... 68/23.7 |
| 7,806,637 | B2 | * | 10/2010 | Oehninger et al. ........... 408/138 |
| 7,946,403 | B2 | * | 5/2011  | Burke et al. .................... 192/90 |

* cited by examiner

*Primary Examiner* — David D Le
*Assistant Examiner* — Stacey Fluhart
(74) *Attorney, Agent, or Firm* — Knobbe, Martens, Olson & Bear LLP (57) ABSTRACT

A clutching arrangement of a positive feed drill comprises a first shaft and a second shaft. The first shaft has a first longitudinal axis and the second shaft has a second longitudinal axis. The first longitudinal axis and the second longitudinal axis being generally aligned. A first clutch gear assembly being rotatable about the first axis. A second clutch gear assembly being rotatable about the second axis. The second clutch gear assembly and the second shaft being axially moveable toward and away from the first clutch gear assembly and the first shaft.

13 Claims, 11 Drawing Sheets

SPLIT-SHAFT CLUTCHING ARRANGEMENT OF A POSITIVE FEED DRILL

CROSS-REFERENCE TO RELATED APPLICATIONS

The present application claims the priority benefit under 35 U.S.C. §119(e) of U.S. Provisional Application No. 61/155,412, filed on Feb. 25, 2009, which is hereby incorporated by reference in its entirety.

BACKGROUND OF THE INVENTION

1. Field of the Invention

The present invention generally relates to clutching arrangements for positive feed drills and, in particular, to clutching arrangements for positive feed drills that feature two clutching gears mounted to separate shafts.

2. Description of the Related Art

Figure 1:
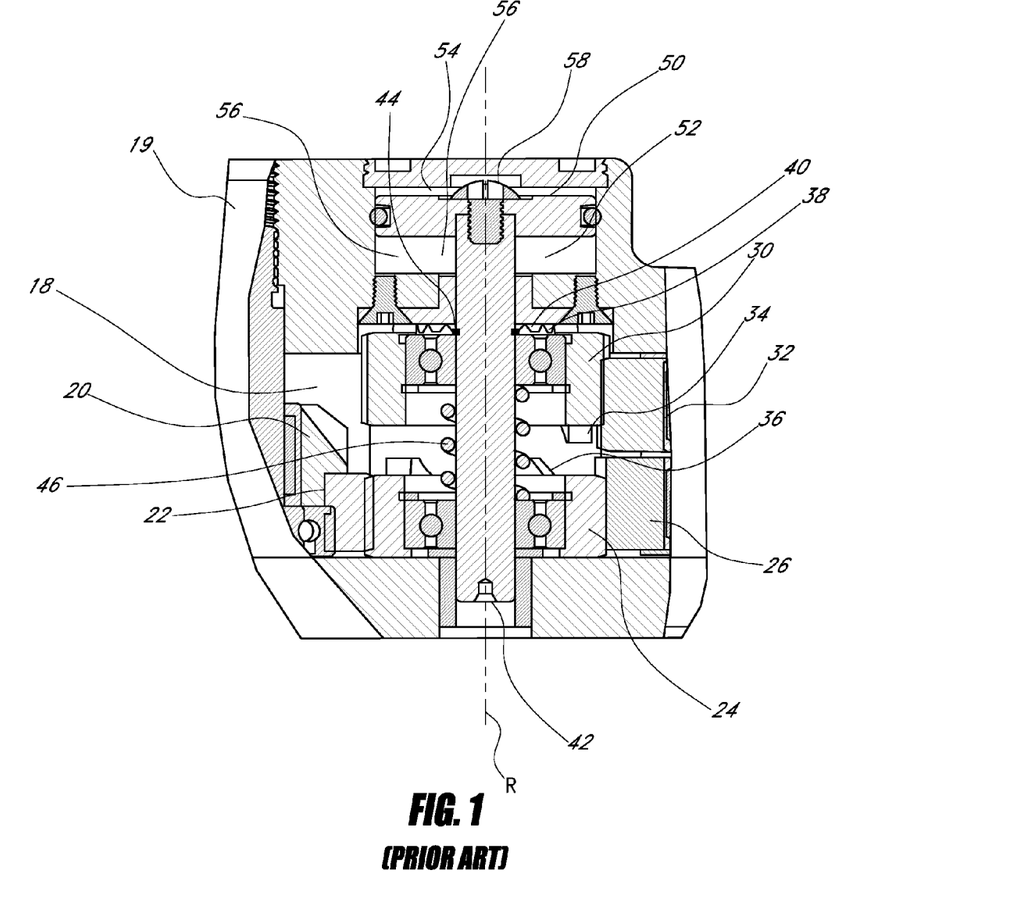
FIG. 1 is a sectioned side elevation view of a prior positive feed drill drive featuring a clutching arrangement.

Positive feed drills are used to produce accurately placed and accurately dimensioned holes in workpieces. One application of this type of drill is in the aircraft industry where the holes are formed in materials that can be very difficult to cut. In some environments, the drills may periodically bind during operation. The binding can result from overloading caused by drilling deep holes or by heavy reaming, which results in metal chips being packed heavily in between the cutter flutes. The torque and thrust loads can be very high under overload conditions, which may resist the automatic withdrawal of the cutter from the workpiece. With reference to FIG. 1, a prior construction of a positive feed drill will be discussed to illustrate some of the causes of the failures being experienced.

SUMMARY OF THE INVENTION

With reference to FIG. 1, a clutching arrangement 18 of a prior positive feed drill will be described. As shown, the prior clutching arrangement 18 was positioned within a housing 19. A motor (not shown) had a drive shaft that carried a first bevel gear (not shown). The first bevel gear drove a second bevel gear 20. The second bevel gear 20 was connected to an input gear 22. The input gear 22 meshed with a lower clutch gear 24. The lower clutch gear 24 meshed with a drive gear 26. Typically, the lower clutch gear 24 and the drive gear 26 had a 1:1 ratio so that the drive gear 26 rotated at the same speed as the clutch gear 24. Thus, a 1:1 driving connection was established between the motor and the drive gear 26. The drive gear 26 powered a cutter spindle (not shown) such that the cutter spindle rotated a cutting tool (not shown).

An upper clutch gear 30 meshed with a feed gear 32. As will be described below, the feed gear 32 had a threaded relationship with the cutter spindle such that, if the feed gear 32 was stationary relative to the cutter spindle, the cutter spindle would move in one axial direction and, if the feed gear 32 was moving faster than the cutter spindle, the cutter spindle would move in an opposite axial direction.

To control the movement of the feed gear and the direction of axial movement, the upper clutch gear 30 moved in an axial direction. The upper clutch gear 30 included axial teeth 34 and the lower clutch gear 24 included axial teeth 36. The two sets of axial teeth 34, 36 would engage each other when the upper clutch gear 30 moved axially downward into engagement with the lower clutch gear 24. When the teeth 34, 36 engaged, the upper and lower clutch gears 30, 24 rotated together, which caused rotation of the feed gear 32 and the drive gear 26 respectively. When the teeth 34, 36 disengaged, the lower clutch gear 24 continued to rotate while the upper clutch gear 30 stopped rotating, which caused the drive gear 26 to continue rotating while the feed gear 32 stopped rotating. The upper clutch gear 30 also comprised upwardly extending teeth 38 that meshed with stationary teeth 40 such that the upper clutch gear 30 could be secured against rotation.

Thus, the prior clutching arrangement was designed to control the rotation of the feed gear 32, which in turn caused the cutter spindle (not shown) and the cutting tool (not shown) to advance into or retract from a work piece. In the prior configuration, when the rate of rotation of the feed gear 32 was greater than the rate of rotation of the drive gear 26, the cutting tool (not shown) advanced toward a work piece and, when the rate of rotation of the feed gear 32 was less than the rate of rotation of the drive gear 26, the cutting tool (not shown) retracted from the work piece.

As shown in FIG. 1, the lower clutch gear 24 and the upper clutch gear 30 were mounted along a single solid shaft 42. The solid shaft 42 extended through a spring 46 that was positioned between the lower clutch gear 24 and the upper clutch gear 30. The axial position of the lower clutch gear 24 was generally fixed by the housing and a bushing member but the upper clutch gear 30 was designed to travel axially along with the axial movement of the solid shaft 42. A snap ring 44 secured the upper clutch gear 30 in axial location along the solid shaft 42 from the top while the spring 46 generally urged the upper clutch gear 30 against the snap ring 44 to hold the clutch gear 30 in axial location along the solid shaft 42 from the bottom.

The solid shaft 42 moved axially up and down. Because the upper clutch gear 30 was generally secured in location along the solid shaft 42, the upper clutch gear 30 followed the axial movement of the solid shaft 42. In other words, when the solid shaft 42 moved downward along the axis of rotation R of the upper clutch gear 30, the upper clutch gear 30 made the same axial translation.

As shown, a piston 50 divided an air cylinder 52 into an upper chamber 54 and a lower chamber 56. The piston 50 was secured to the upper end of the solid shaft 42 by a bolt 58. When the pressure in the upper chamber 54 was sufficiently higher than the pressure in the lower chamber 56 combined with the force from the spring 46, the solid shaft 42 moved downward, thereby moving the upper clutch gear 30 toward the lower clutch gear 24. When the pressure in the lower chamber 56 combined with the force from the spring 46 was sufficiently higher than the pressure in the upper chamber 54, the solid shaft 42 moved upward, thereby moving the upper clutch gear 30 away from the lower clutch gear 24.

Under certain conditions, such as when drilling a deep hole, performing heavy reaming, or when metal chips are tightly packed within the cutting tool's flutes, the torque and thrust load on the drill were very high. These loads often prevented automatic withdrawal of the cutter from the work piece because the high thrust load coupled with high torque transferred through the lower clutch gear 24 and the upper clutch gear 30 to the solid shaft 42. The loads would cause a misalignment of the centerlines of the clutch gears 24, 30 and the solid shaft 42. It was found, however, that even a minute misalignment resulted in increased friction, binding, and wear on the clutch gears 24, 30 and the solid shaft 42. In addition, it was discovered that the slight misalignment reduced the likelihood of the upper clutch gear 30 properly engaging and disengaging the lower clutch gear 24.

In addition, the high-load dynamic conditions sometimes caused the snap ring 44 to snap out of its groove along the solid shaft 42. To replace the snap ring 44 within the groove, the drill had to be turned off and disassembled so that the snap ring 44 could be replaced. This maintenance downtime was extensive because of the retaining ring's central positioning in the clutching arrangement.

Accordingly, a split shaft clutching assembly has been developed to relieve the loading issues while an integrated rib has been developed to address the snap ring failures. Thus, in accordance with one embodiment that is arranged and configured in accordance with certain features, aspects and advantages of the present invention, a clutching arrangement comprises a first shaft secured to a housing. The first shaft defines a first axis of rotation. A second shaft is mounted in the housing and defines a second axis of rotation. The second axis of rotation generally is aligned with the first axis of alignment. A first clutch gear assembly is rotatably mounted on the first shaft. The first clutch gear assembly comprises a first tooth. A second clutch gear assembly is rotatably mounted on the second shaft. The second clutch gear assembly comprises a second tooth. The first tooth and the second tooth are positioned between the first clutch gear assembly and the second clutch gear assembly. The second clutch gear assembly and the second shaft are adapted to move axially along the second axis of rotation toward the first clutch gear assembly and the first shaft such that the first tooth and the second tooth can selectively engage each other.

In another configuration, a clutching arrangement is provided for a positive feed drill. The positive feed drill comprises a housing that defines a clutching arrangement accommodating chamber. The clutching arrangement comprises a lower clutch gear that is drivingly engaged with a drive gear. A stationary stub shaft is mounted to the housing. The stationary stub shaft comprises a first shaft longitudinal axis. A first bearing is positioned on the stationary stub shaft. The first bearing is mounted within the lower clutch gear. A first retainer ring secures the first bearing within the lower clutch gear. The first bearing is interposed between at least a portion of the lower clutch gear and the stub shaft. The lower clutch gear is rotatable around the first shaft longitudinal axis relative to the stationary stub shaft. A clutch ring is mounted to the housing. A floating shaft comprises a second shaft longitudinal axis and a flange. The floating shaft extends through the clutch ring. The floating shaft is capable of axial movement along the second shaft longitudinal axis relative to the clutch ring. A second bearing is supported by the clutch ring. The second bearing is interposed between the clutch ring and a portion of the floating shaft. An upper clutch gear is drivingly engaged with a feed gear. A third bearing is positioned within the upper clutch gear. The third bearing is interposed between a portion of the upper clutch gear and the floating shaft. A second retainer ring secures the third bearing within the upper clutch gear. The upper clutch gear is rotatable around the second shaft longitudinal axis relative to the floating shaft. The upper clutch gear is capable of movement along the second shaft longitudinal axis relative to the housing. A spring is positioned between the lower clutch gear and the upper clutch gear. The spring surrounds an upper portion of said stationary stub shaft and a lower portion of said floating shaft. The spring applies an upward spring force to the upper clutch gear. The upward spring force biases the upper clutch gear away from the lower clutch gear. A lower clutch gear tooth is positioned on an upward-facing surface of the lower clutch gear. An upper clutch gear tooth is positioned on a downward-facing surface of the upper clutch gear. The upper clutch gear is in an advance position when the lower clutch gear tooth engages the upper clutch gear tooth, whereby the upper clutch gear drives the feed gear. A first clutch ring tooth is positioned on a downward-facing surface of the clutch ring. A second clutch ring tooth positioned on an upward-facing surface of the upper clutch gear. The upper clutch gear is in a retract position when the first clutch ring tooth engages the second clutch ring tooth, whereby the upper clutch gear stops the feed gear.

In yet another configuration, a clutching arrangement for a positive feed drill comprises a first clutch gear that comprises a first longitudinal axis. The first clutch gear is rotatable about a fixed stub shaft that defines the first longitudinal axis. A floating shaft comprises a second longitudinal axis. The floating shaft is axially moveable along the second longitudinal axis. The first longitudinal axis and the second longitudinal axis are generally aligned. A second clutch gear is rotatable relative to the floating shaft around the second longitudinal axis. The second clutch gear translates along the second longitudinal axis along with the floating shaft. A first clutch gear tooth is positioned on the first clutch gear. A second clutch gear tooth is positioned on the second clutch gear. The second clutch tooth engages the first clutch gear tooth when the second clutch gear approaches the first clutch gear.

BRIEF DESCRIPTION OF THE DRAWINGS

These and other features, aspects and advantages of certain embodiments of the present invention will be described with references to the accompanying drawings.

DETAILED DESCRIPTION OF THE PREFERRED EMBODIMENT

Figure 2:
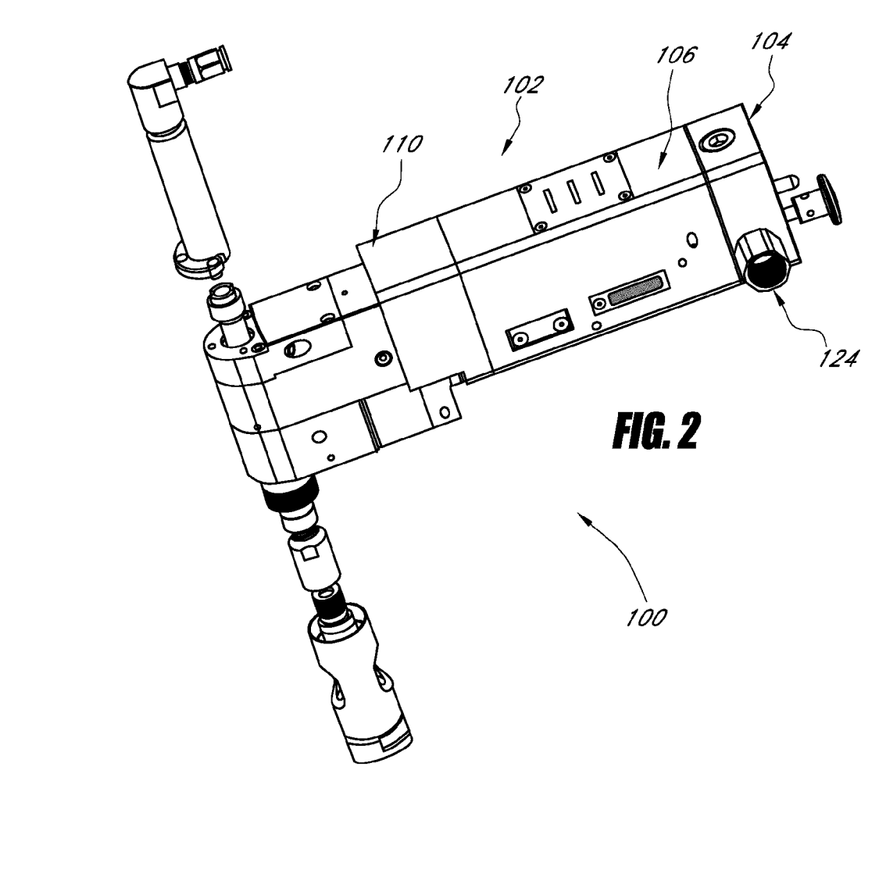
FIG. 2 is a perspective view of a positive feed drill having a clutching arrangement that is arranged and configured according to certain features, aspects, and advantages of an embodiment of the present invention.
Figure 3:
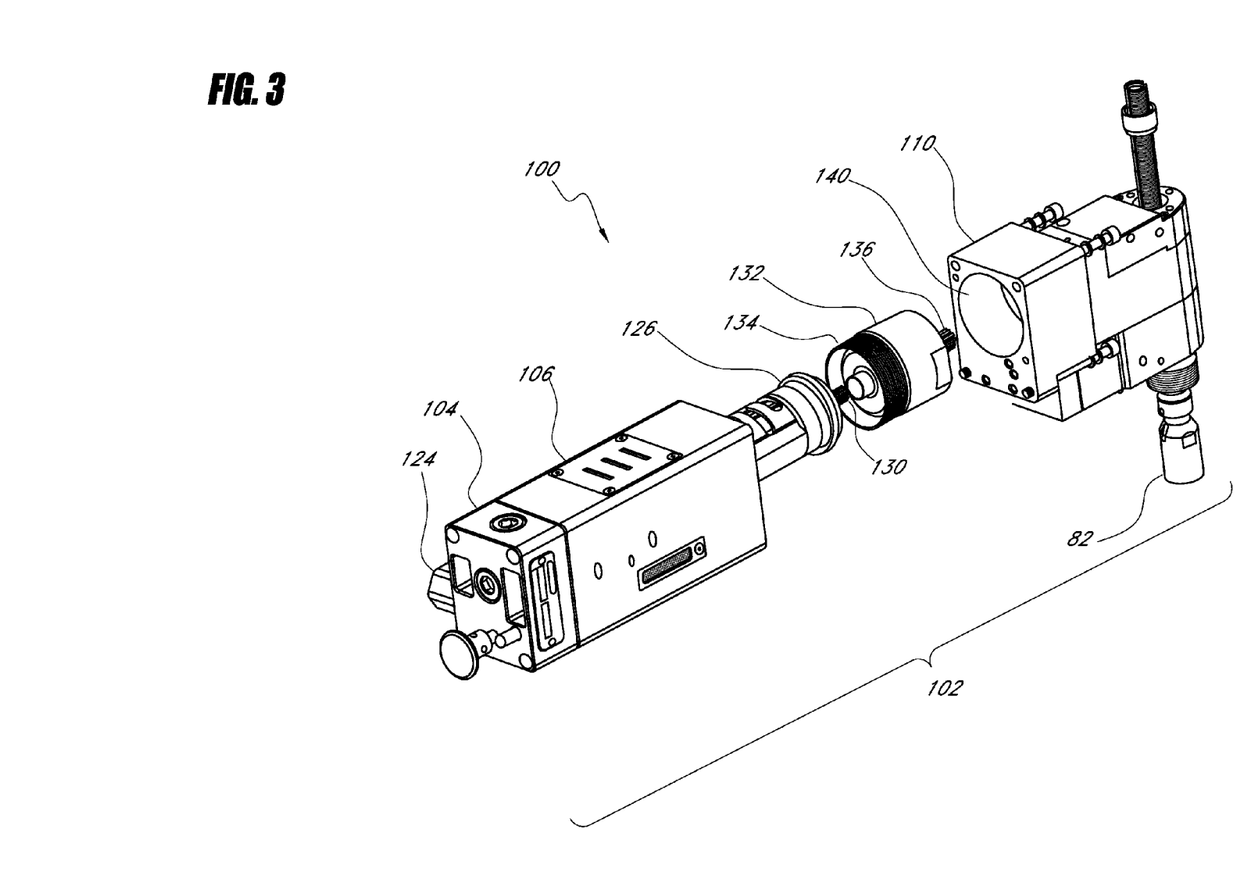
FIG. 3 is an exploded perspective view of the positive feed drill depicted in FIG. 2, illustrating an air motor housing, a planetary gear reducer, and an angle head module.
Figure 4:
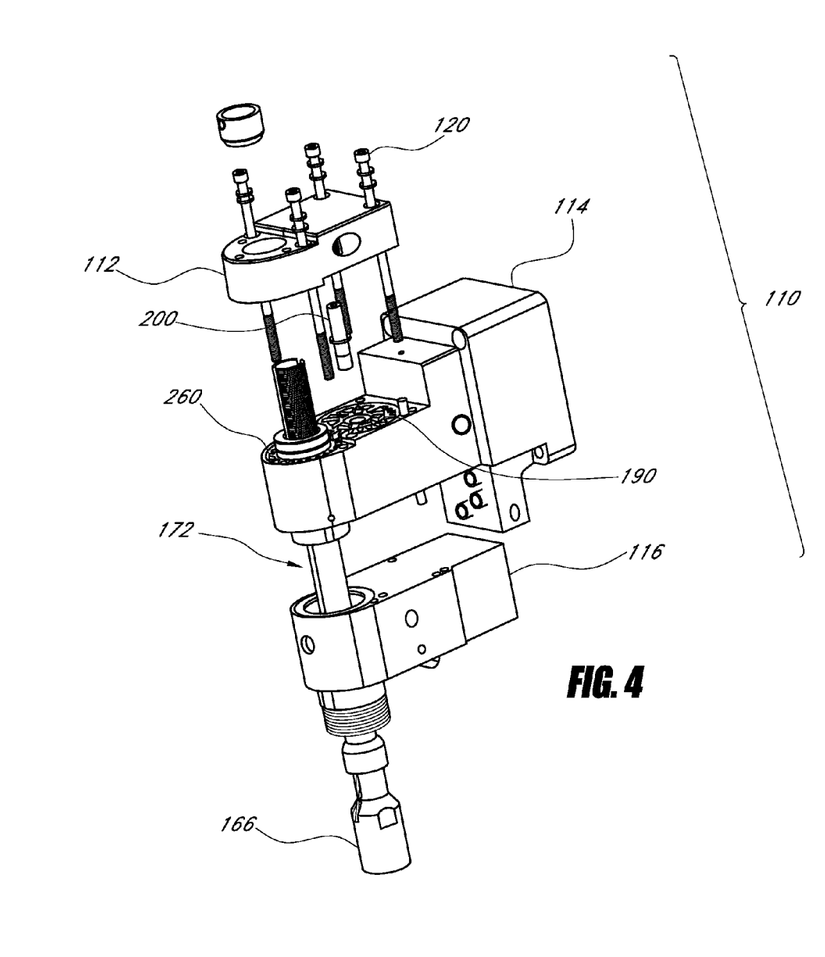
FIG. 4 is an exploded perspective view of major subassemblies of the angle head module of the positive feed drill depicted in FIG. 2.

FIGS. 2 and 3 illustrate a positive feed drill 100 that is arranged and configured in accordance with certain features, aspects and advantages of an embodiment of the present invention. As illustrated in FIGS. 2 and 3, the drill 100 comprises a housing assembly 102. The illustrated housing assembly 102 comprises a number of components that are secured together to define the outer shell of the drill 100.

An end housing 104 is connected to an air motor housing 106 and the air motor housing 106 is connected to an angle head module 110. The illustrated angle head module 110 comprises an upper housing subassembly 112, a middle housing subassembly 114 and a lower housing subassembly 116. In the illustrated embodiment, the subassemblies 112, 114, 116 are secured together with threaded fasteners 120. Other configurations are possible.

The housing assembly 102 houses a drive train of the drill 100. In the illustrated configuration, the drill 100 is pneumatically driven and, as such, the drive train can be considered to start with an air inlet fitting 124. The air inlet fitting 124 is mounted to the end housing 104 and supplies air to an air motor 126 through a system of air channels contained within the housing assembly 102.

A portion of the air motor 126 is shown in FIG. 3. The air motor 126 is positioned within the air motor housing 106 and comprises an output shaft 130. In the illustrated embodiment, the output shaft 130 comprises splines. Preferably, the air motor 126 is powered by 90-120 psi air pressure, which causes the output shaft to rotate at high rotational speeds with low torque output.

The output shaft 130 couples to a planetary gear reducer 132. The planetary gear reducer 132 decreases the rotational speed from the output shaft and increases the torque output. Different planetary gear reducers can be provided to provide different speed outputs and different torque outputs. Thus, the planetary gear reducers can be interchanged as desired. As shown in FIG. 3, the illustrated planetary gear reducer 132 comprises a threaded surface 134. The threaded surface 134 threads into a bore (not shown) formed in an end of the air motor housing 106. Thus, the air motor 126 and the planetary gear reducer 132 can be coupled to the air motor housing 106.

Figure 5:
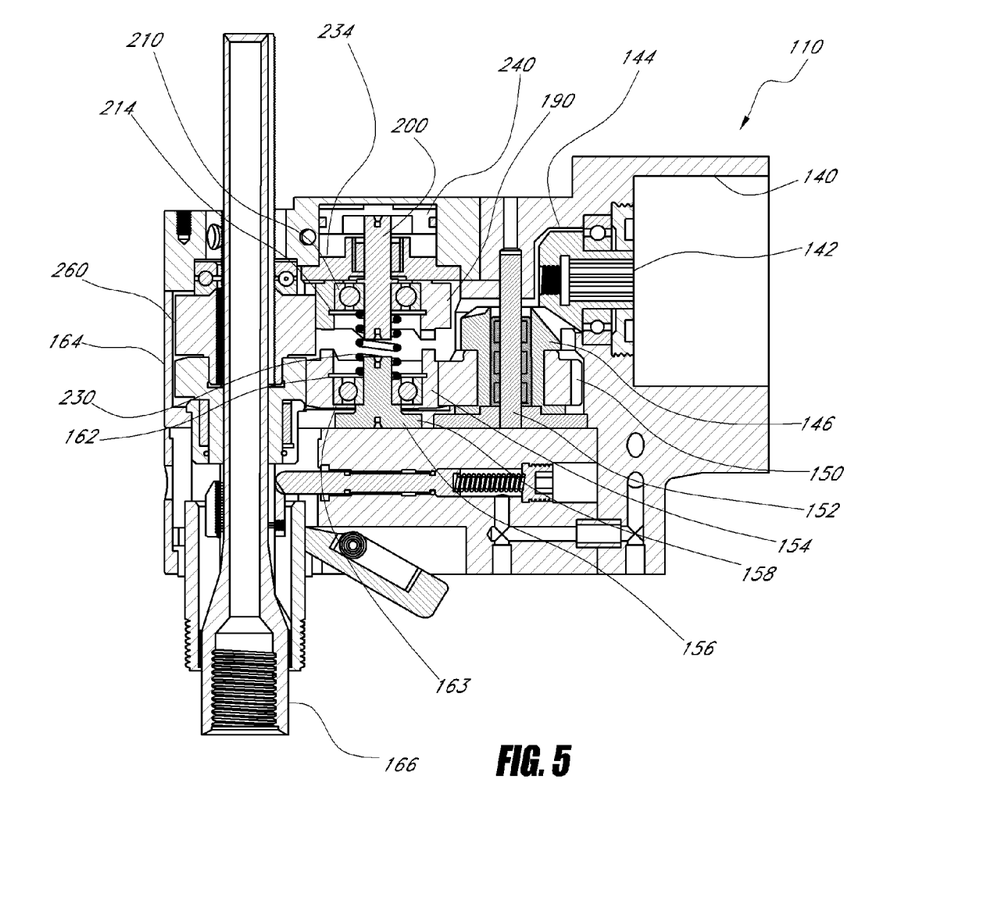
FIG. 5 is a sectioned side elevation view of the angle head module of the positive feed drill depicted in FIG. 2 showing the clutching arrangement in a position wherein a cutting tool would be retracted.

The planetary gear reducer 132 comprises an output shaft. The output shaft preferably comprises a splined portion 136. The planetary gear reducer 132 preferably is received within a recess 140 formed within the angle head module 110. With reference now to FIG. 5, the splined portion 136 of the output shaft is received within a splined portion 142 of a first bevel gear 144.

The first bevel gear 144 drives a second bevel gear 146. A spur gear 150 is mounted to the second bevel gear 146 such that the spur gear 150 rotates with the second bevel gear 146. In the illustrated embodiment, a shaft 152 supports the second bevel gear 146 and the spur gear 150.

The spur gear 150 drives a lower clutch gear 154. As shown in FIG. 5, the lower clutch gear 154 is supported by a first stub shaft 156. In the illustrated embodiment, the first stub shaft 156 supports a bearing 160 and the bearing 160 supports the lower clutch gear 154. The stub shaft 156 comprises a threaded portion 158, which is secured in position within the middle housing subassembly 114. Preferably, the threaded portion 158 threads into position from an outside of the middle housing subassembly 114 such that the enlarged threaded portion 158 is sandwiched between the middle housing subassembly 114 and the lower housing subassembly 116. Such a configuration secures the shaft 156 and reduces the likelihood of the shaft loosening over time. Other arrangements also can be used to secure the stub shaft 156 in position. The fixed stub shaft 156 provides a strong and sturdy support for the lower clutch gear 154, which rotates about the fixed stub shaft 156. Accordingly, such a construction can withstand high side loads.

In the illustrated configuration, a retainer ring 162 secures the bearing 160 in place within the lower clutch gear 154. In other words, the bearing 160 is secured between the retainer ring 162 and a shoulder 163 formed in the lower clutch gear 154. The shoulder 163 can be integrally formed or can be a separate component, such as a retainer ring, for example but without limitation. The shoulder 163, however, provides improved reliability due to the decreased number of components.

Figure 14:
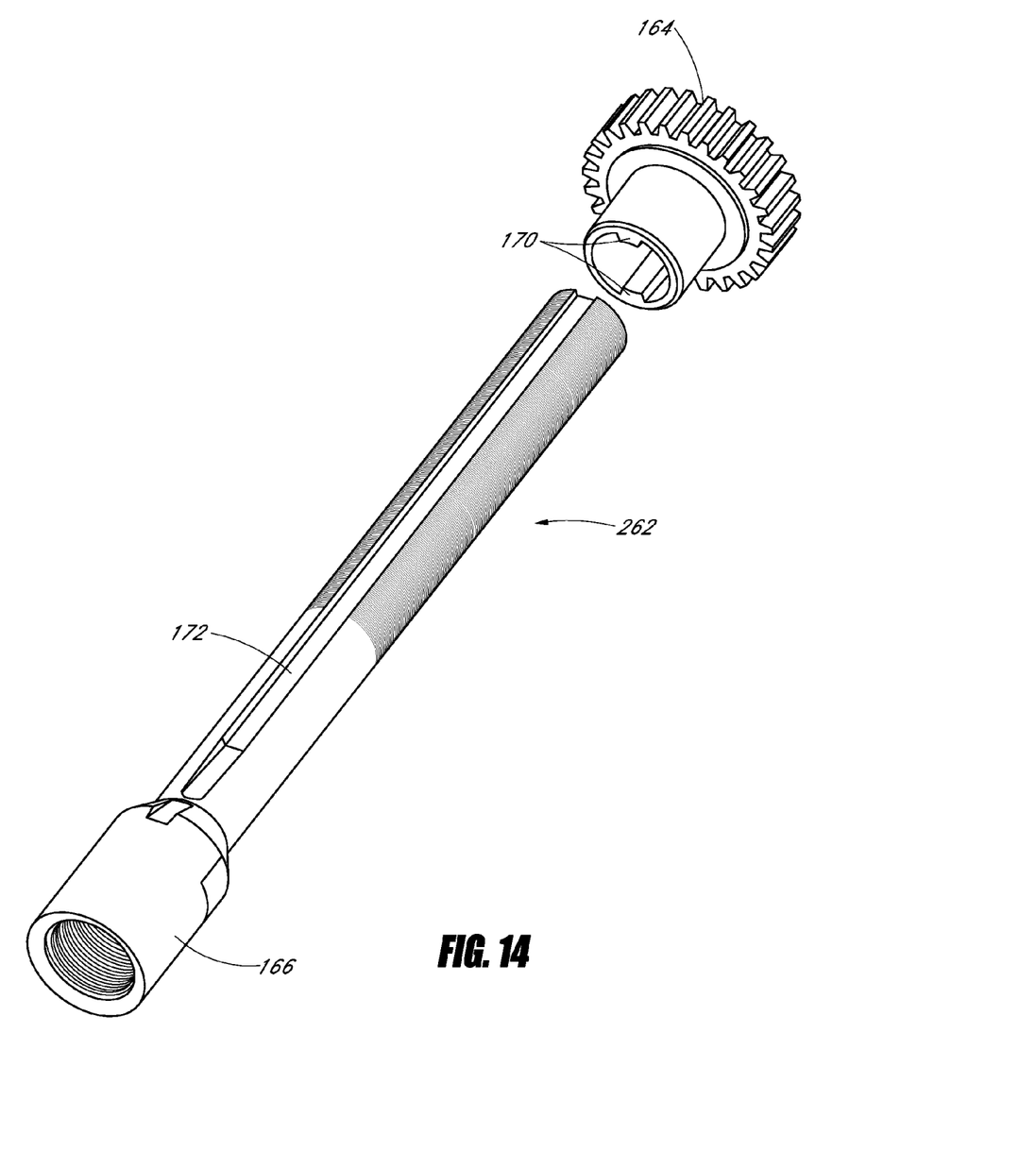
FIG. 14 is an exploded perspective view of the drive gear and cutter spindle of the positive feed drill depicted in FIG. 2.

The lower clutch gear 154 drives a drive gear 164. The drive gear 164 is joined for rotation to a cutter spindle 166 such that rotation of the drive gear 164 results in rotation of the cutter spindle 166. In one configuration, such as that shown in FIG. 14, the drive gear 164 comprises internal keys 170 that match keyways 172 formed in the cutter spindle 166. Other arrangements also can be used to couple the drive gear 164 for rotation with the cutter spindle 166. In view of the rotational coupling of the drive gear 164 and the cutter spindle 166, and in view of the engaged gear coupling of the lower clutch gear 154 and the drive gear 164, rotation of the lower clutch gear causes rotation of the cutter spindle 166.

Figure 9:
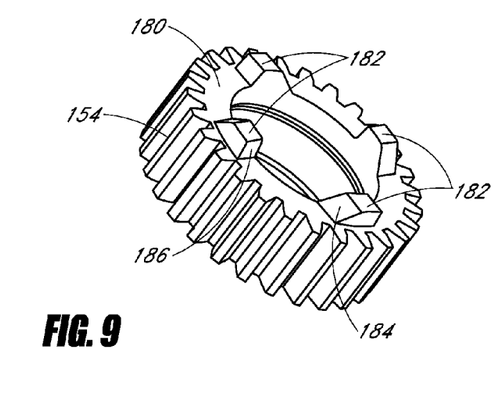
FIG. 9 is a perspective view of the lower clutch gear of the clutching arrangement depicted in FIG. 7.

With reference now to FIG. 9, the lower clutch gear 154 comprises an upwardly-facing surface 180. The upwardly facing surface 180 comprises a plurality of clutching teeth 182. While the illustrated configuration comprises four clutching teeth 182 that are generally equally spaced around the upwardly-facing surface 180, other configurations are possible. Each tooth 182 preferably comprises a sloping trailing surface 184 as well as a sloping leading surface 186. Preferably, the leading surface 186 slopes at about 7 degrees from perpendicular while the trailing surface 184 slopes at about 45 degrees from perpendicular. The leading surface 186 defines a contact surface in the illustrated configuration.

Figure 10:
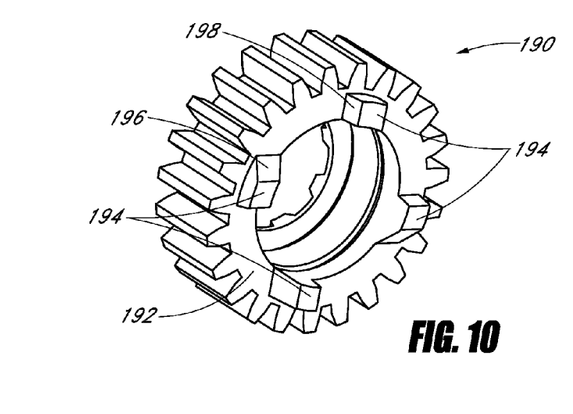
FIG. 10 is a perspective view of the lower side of the upper clutch gear of the clutching arrangement depicted in FIG. 7.
Figure 11:
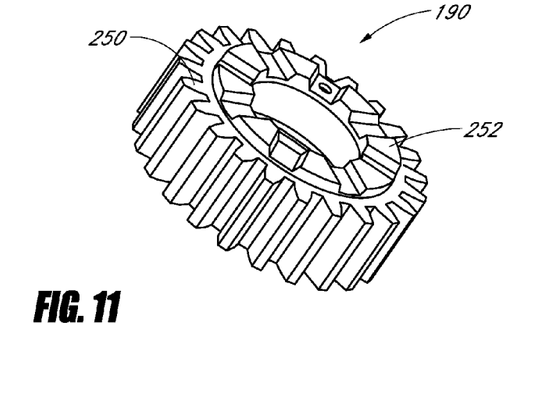
FIG. 11 is a perspective view of the upper side of the upper clutch gear depicted in FIG. 9.
Figure 13:
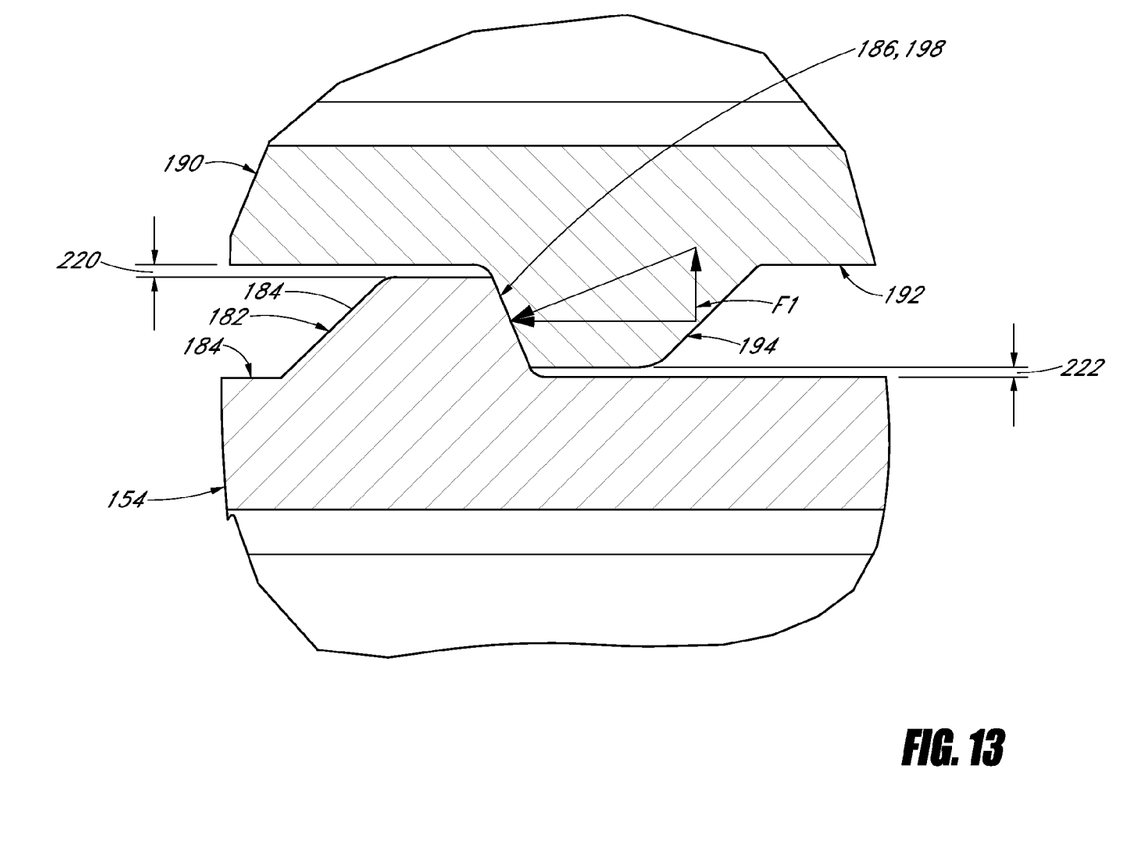
FIG. 13 is an enlarged sectioned view of an upper clutch gear tooth of the upper clutch gear depicted in FIG. 9 interlocking with a lower clutch gear tooth of the lower clutch gear depicted in FIG. 12.

As shown in FIG. 13, the lower clutch gear 154 selectively engages with an upper clutch gear 190. FIGS. 10 and 11 provide two views of the upper clutch gear 190 in the illustrated embodiment. As illustrated, the upper clutch gear 190 comprises a downwardly-facing surface 192. The downwardly facing surface 192 comprises a plurality of clutching teeth 194. In the illustrated configuration, the upper clutch gear 190 comprises four clutching teeth 194 that are generally equally spaced about the downwardly facing surface 192 but other configurations can be used. In addition, while the number of clutching teeth 182 on the lower clutch gear 154 matches the number of clutching teeth 194 on the upper clutch gear 190, other configurations also are possible.

As shown in FIG. 10, the clutching teeth 194 of the upper clutch gear 190 comprise a sloping trailing surface 196 and a sloping leading surface 198. Preferably, the leading surface 198 slopes at an angle of about 7 degrees from perpendicular while the trailing surface 196 slopes at an angle of about 45 degrees. With reference again to FIG. 13, the leading surface 198 of the upper clutch gear 190 preferably defines a contract surface that can engage with the leading surface 186 of the lower clutch gear 154.

Figure 7:
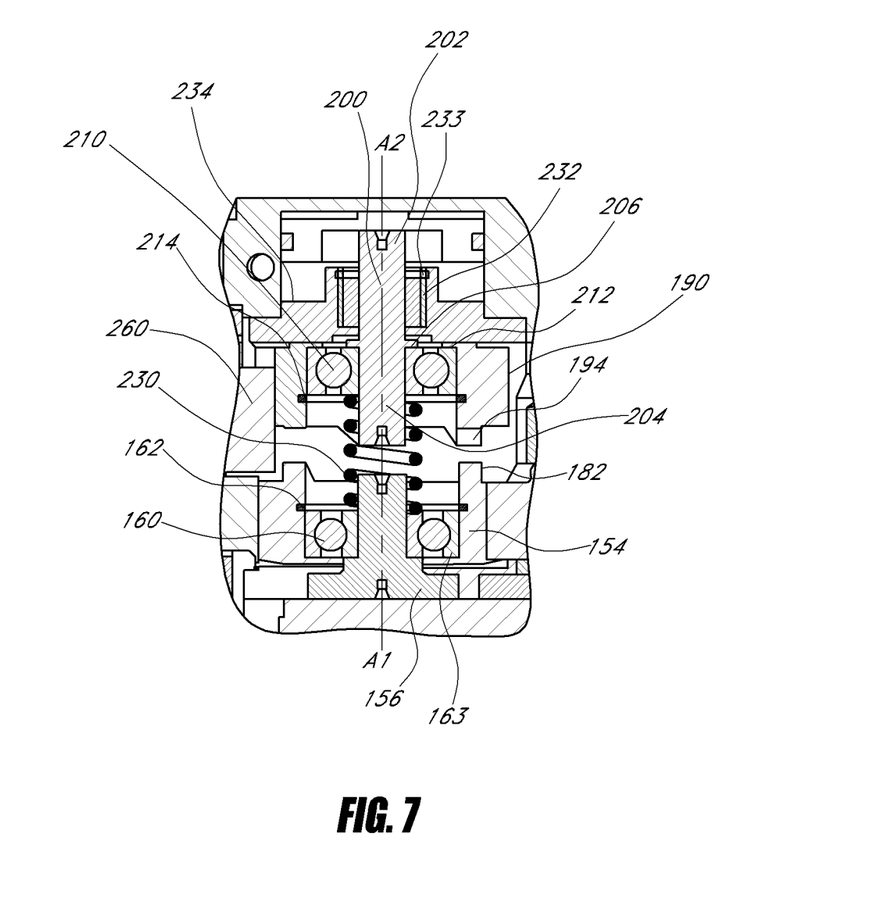
FIG. 7 is an enlarged sectioned elevation view of the clutching arrangement of the positive feed drill depicted in FIG. 2 wherein the clutching arrangement is in a retract position.
Figure 8:
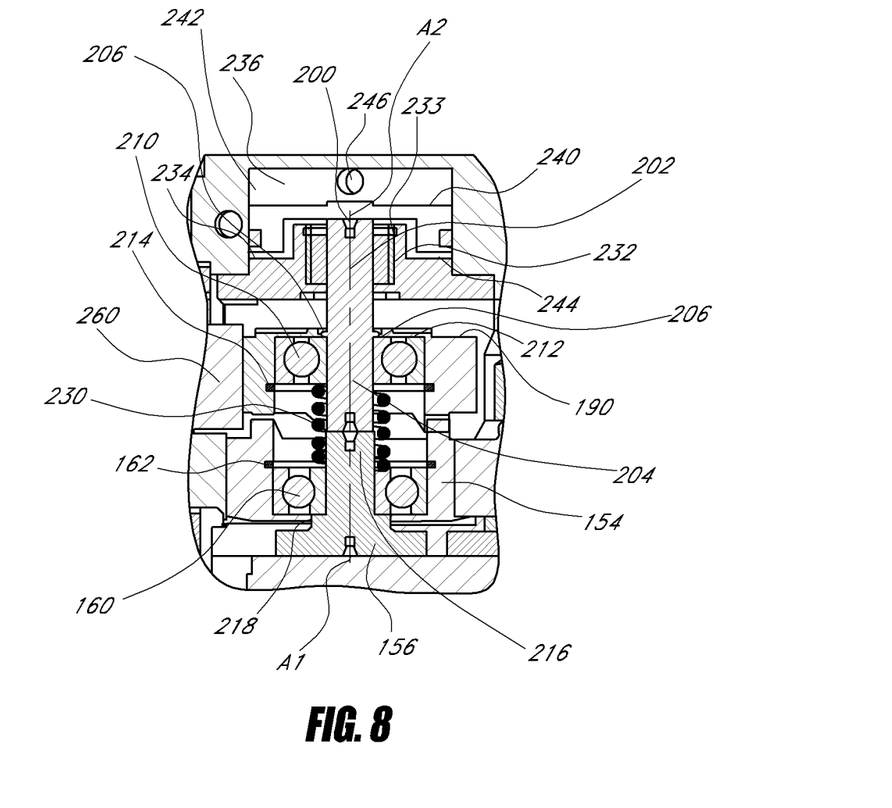
FIG. 8 is an enlarged sectioned elevation view of the clutching arrangement of the positive feed drill depicted in FIG. 2 wherein the clutching arrangement is in an advance position.

With reference now to FIGS. 7 and 8, the upper clutch gear 190 is carried on a floating shaft 200. As shown, the floating shaft 200 comprises an upper end 202 and a lower end 204.

Intermediate of the upper end 202 and the lower end 204, the illustrated floating shaft 200 comprises a rib 206. While the illustrated rib 206 is integrated into the floating shaft 200, other arrangements may utilize a separable component. The integrated rib 206, however, improves reliability and decreases manufacturing costs.

A bearing 210 is positioned within the upper clutch gear 190. The bearing 210 is mounted over the lower end 204 of the floating shaft 200. As with the lower clutch gear 154, the upper clutch gear 190 comprises a shoulder 212 and a retainer ring 214 secures the bearing 210 within the upper clutch gear 190 between the shoulder 212 and the retainer ring 214.

As shown in FIG. 7, the lower end 204 of the floating shaft 200 protrudes below the upper clutch gear 190. With reference now to FIG. 8, the floating shaft 200 comprises an axis A2 that generally aligns within an axis A1 of the fixed stub shaft 156. In the illustrated construction, absolutely perfect alignment of the two axes A1, A2 is unnecessary and slight misalignments can be accommodated. In addition, because the floating shaft 200 is separate of the stub shaft 156, side loads encountered by the stub shaft 156 are not transferred from the stub shaft 156 to the floating shaft 200, which allows significantly more freedom in movement for the floating shaft 200 relative to the single shaft construction described above.

The floating shaft 200 moves vertically generally along the axis A2. In its lowermost position, the lower end 204 of the floating shaft 200 abuts against an upper end 216 of the lower clutch gear 154. With reference to FIGS. 8 and 13, the length of the shafts 156, 200 between the rib 206 of the floating shaft 200 and a shoulder 218 of the stub shaft 156 is slightly longer than a sum of (1) the distance between the downwardly facing surface 192 and the shoulder 212 of the upper clutch gear 190, (2) the distance between the upwardly facing surface 180 and the shoulder 163 of the lower clutch gear 154 and (3) the largest height of the teeth 182, 194. In other words, when the floating shaft 202 moves into contact with the stub shaft 156, a gap 220 is defined between the teeth 182 and the downwardly facing surface 192 and a gap 222 is defined between the teeth 194 and the upwardly facing surface 180. In some configurations, the gap ranges from about 0.010 inch to about 0.020 inch.

Due to the gaps 220, 222 Thus, the contact surface area between the lower clutch gear 154 and the upper clutch gear 190 is greatly reduced compared to a construction in which the gear teeth engage along the full length. In other words, only portions of the contact surfaces 186, 198 are in contact when the clutch gears 154, 190 are engaged. Accordingly, the illustrated configuration results in less friction, which reduces binding and encourages smooth engagement and disengagement of the clutch gears 154, 190. Moreover, the illustrated configuration provides for smoother transmission of torque and rotation from the lower clutch gear 154 to the upper clutch gear 190. Furthermore, the angled contact surfaces (e.g., the contact surfaces are angled at about 7 degrees, as discussed above) create an upward force (F1) as shown in FIG. 13, which upward force F1 creates a natural tendency for the clutch gears 154, 190 to separate. Thus, the angled contact surfaces also encourage improved disengagement.

With reference again to FIGS. 7 and 8, a biasing member 230 can be interposed between the lower clutch gear 154 and the upper clutch gear 190. Any suitable biasing member 230 can be used. In some embodiments, the biasing member 230 is a compression spring. The compression spring 230 in the illustrated configuration extends between the inner race of the lower bearing 160 and the inner race of the upper bearing 210 and the compression spring 230 generally encircles a portion of the stub shaft 156 and a portion of the floating shaft 200.

Such a configuration allows use of a smaller diameter compression spring 230. Other configurations also can be used, such as larger diameter compression springs, which may help to maintain better alignment of the axes A1, A2.

A bearing 232 supports the upper end 202 of the floating shaft 200. The bearing 232 can be secured in position with a retaining ring 233. In the illustrated configuration, the bearing 232 comprises a needle bearing. The bearing 232 allows relatively free axial and rotational movement of the floating shaft 200. A clutch ring 234 supports the bearing 232, which supports the floating shaft 200. The clutch ring 234 can be secured in position with one or more mechanical fasteners (e.g., screws).

As shown in FIGS. 7 and 8, the clutch ring 234 generally encloses a region defined by a recess 236 within the upper housing subassembly 112. The enclosed recess 236 contains a piston 240 that divides the recess 236 into an upper chamber 242 and a lower chamber 244. The piston 240 is secured to or supported by the upper end 202 of the floating shaft 200. In some embodiments, the piston 240 merely bears against the extreme upper end 202 of the floating shaft 200.

FIG. 8 shows a port 246 that can be used to alter a pressure within the upper chamber. When air is supplied to the upper chamber 242, the piston 240 moves downward within the recess 236, which moves the floating shaft 200 downward. The rib 206 on the floating shaft 200 bears against the bearing 210, which causes the bearing 210 and associated upper clutch gear 190 to move downward and compress the biasing member 230. Thus, the upper clutch gear 190 moves toward, and eventually into engagement with, the lower clutch gear 154. As the pressure in the upper chamber 242 decreases, the biasing force of the biasing member 230 overcomes the pressure in the upper chamber 242, which allows the piston 240 to travel upward within the recess 236 and which allows the upper clutch gear 190 to move away from the lower clutch gear 154.

Figure 12:
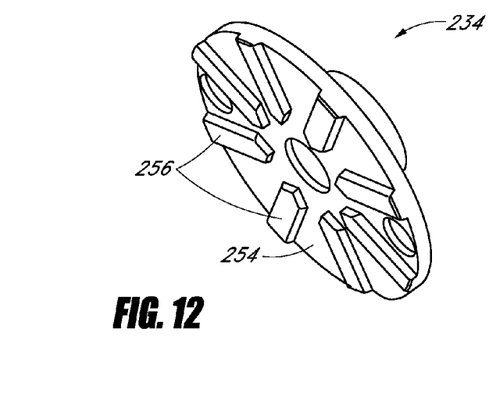
FIG. 12 is a perspective view of a clutch ring of the clutching arrangement depicted in FIG. 7.

With reference now to FIGS. 11 and 12, the upper clutch gear 190 comprises an upwardly facing surface 250. The upwardly facing surface 250 comprises a plurality of upwardly extending teeth 252. Similarly, the clutch ring 234 comprises a downwardly facing surface 254 and the downwardly facing surface 254 comprises a plurality of teeth 256. The two sets of teeth 252, 256 are arranged and configured to stop rotation of the upper clutch gear 190 when the teeth 252, 256 are engaged. While the illustrated configuration comprises sets of eight, generally symmetrically disposed teeth, other rotation-limiting configurations also can be used.

Figure 6:
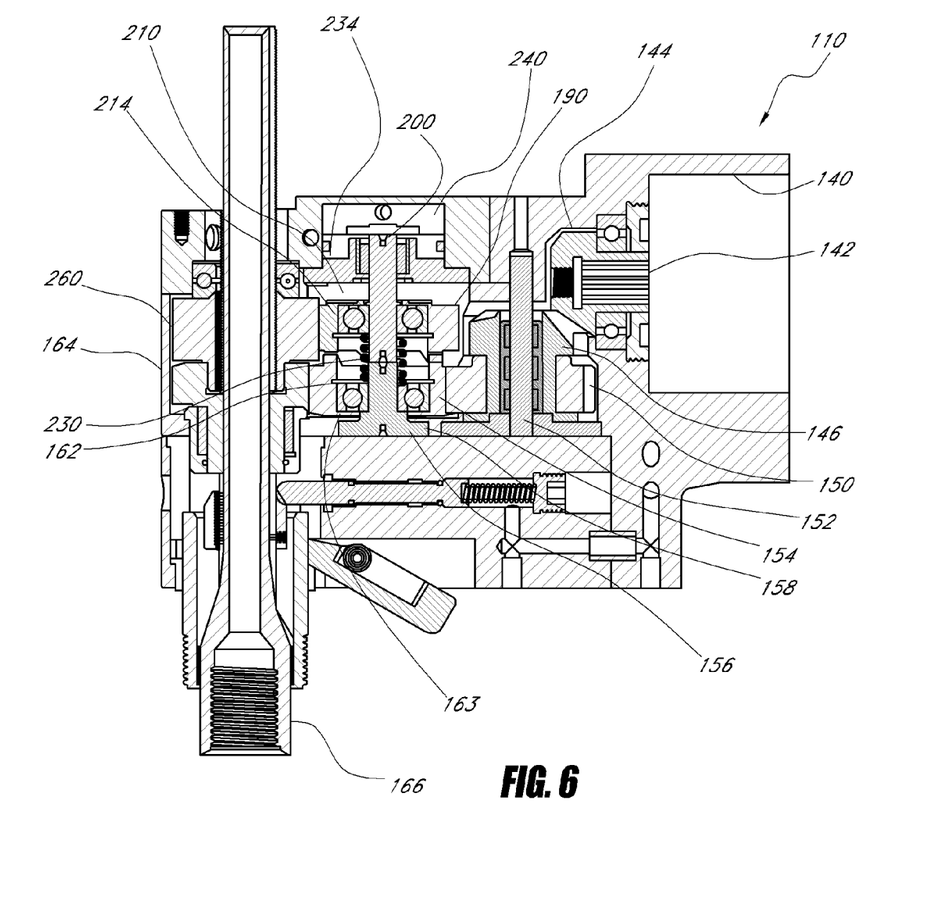
FIG. 6 is a sectioned side elevation view of the angle head module of the positive feed drill depicted in FIG. 2 showing the clutching arrangement in a position wherein the cutting tool would be advanced.

With reference again to FIGS. 5 and 6, the upper clutch gear 190 meshes with a feed gear 260. The upper clutch gear 190 translates axially along the axis A2 relative to the feed gear 260 but remains engaged with the feed gear 260 during this axial translation. The feed gear 260 has a threaded inner surface that receives a threaded portion 262 of the cutter spindle 166 (see FIG. 14).

In operation, the drive gear 164 is constantly driven by the lower clutch gear 154. The cutter spindle 166 is fixed for rotation with the drive gear 164. Thus, the cutter spindle 166 constantly rotates so long as the lower clutch gear 154 is rotating. When the upper clutch gear 190 is secured against rotation by the clutch ring 234, the upper clutch gear 190 and the feed gear 260 are secured against rotation. Because the cutter spindle 166 has a threaded connection with the feed gear, rotation of the cutter spindle 166 relative to the feed gear 260 causes the cutter spindle to move upward relative to the feed gear 260. On the other hand, when the upper clutch gear 190 engages with the lower clutch gear 154, the upper clutch gear 190 rotates at the same speed as the lower clutch gear 154. The gear ratio between the upper clutch gear 190 and the feed gear 260 is such that the feed gear 260 turns faster than the drive gear 164 and the cutter spindle 166. Because the feed gear 260 is rotating faster than the cutter spindle 166, the cutter spindle 166 moves down relative to the feed gear 260. The gear ratios can be varied to obtain the desired movements of the cutter spindle 166 relative to the feed gear 260.

In other words, the downward movement of the cutter spindle 166 results because of a clockwise differential rotation between the drive gear 164 and the feed gear 260 and the left-handed threaded engagement between the feed gear 260 and the cutter spindle 166. The downward movement will occur at a constant feed rate but altering the gear ratios between the upper clutch gear 190 and the feed gear 260, for example, can be used to adjust the fed rate. The feed rate (F) in inches per revolution (in./In.) is determined by the following equation: $F=[(R1/R2)-1]/T$, where $R1=N1/N2$ and $R2=N3/N4$, where N1=number of upper clutch gear teeth, N2=number of feed gear teeth, N3=number of lower clutch gear teeth, N4=number of drive gear teeth, and T=number of threads per inch of the cutter spindle. In the illustrated configuration, because the number of teeth of the lower clutch gear equals the number of teeth of the drive gear, then $R2=1$ and the equation reduces to $F=[R1-1]/T$. In one preferred configuration, the threaded portion 262 of the cutter spindle 166 comprises about 40 threads per inch. Such a configuration provides a wide range of feed rates that can be achieved simply by changing the feed gear 260 and/or the upper clutch gear 190.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A clutching arrangement for a positive feed drill, said clutching arrangement comprising a first shaft secured to a housing and defining a first axis of rotation, a second shaft mounted in said housing and defining a second axis of rotation, said second axis of rotation generally aligned with said first axis of alignment, a first clutch gear assembly rotatably mounted on said first shaft, said first clutch gear assembly comprising a first tooth, a second clutch gear assembly rotatably mounted on said second shaft, said second clutch gear assembly comprising a second tooth, said first tooth and said second tooth being positioned between said first clutch gear assembly and said second clutch gear assembly, and said second clutch gear assembly and said second shaft being adapted to move axially along said second axis of rotation toward said first clutch gear assembly and said first shaft such that said first tooth and said second tooth can selectively engage each other and such that said first shaft and said second shaft do not overlap each other in an axial direction parallel to said first axis of rotation;
wherein the first clutch gear assembly comprises a first surface and the second clutch gear assembly comprises a second surface, the first surface facing the second surface, the first tooth extending toward the second surface from the first surface and the second tooth extending toward the first surface from the second surface; and
wherein the first surface and the second surface do not contact when the first shaft and the second shaft contact.

2. The clutching arrangement of claim 1, wherein said first clutch gear assembly comprises a first clutch gear and a first bearing positioned within said first clutch gear, said first bearing being disposed between said first clutch gear and said first shaft.

3. The clutching arrangement of claim 2, wherein said first clutch gear assembly comprises a first retaining ring, the first clutch gear comprising a first shoulder, a first side of the first bearing abutting the first shoulder and the first retaining ring abutting a second side of the first bearing.

4. The clutching arrangement of claim 3, wherein the second clutch gear assembly comprises a second clutch gear and a second bearing positioned within said second clutch gear, said second bearing being disposed between said second clutch gear and said second shaft.

5. The clutching arrangement of claim 4, wherein said second clutch gear assembly comprises a second retaining ring, the second clutch gear comprising a second shoulder, a first side of the second bearing abutting the second shoulder and the second retaining ring abutting a second side of the second bearing.

6. The clutching arrangement of claim 1, wherein the second shaft comprises a rib with the second clutch gear assembly abutting the rib.

7. The clutching arrangement of claim 6 further comprising a biasing member, the biasing member extending between the first clutch gear assembly and the second clutch gear assembly and the biasing member exerting a force on the second clutch gear assembly such that the second clutch gear assembly generally is held against the rib.

8. The clutching arrangement of claim 1, wherein the first tooth comprises a first contact surface and the second tooth comprises a second contact surface, the first contact surface extending at a non-perpendicular angle from the first surface and the second contact surface extending at a non-perpendicular angle from the second surface.

9. A clutching arrangement for a positive feed drill, said positive feed drill comprising a housing that defines a clutching arrangement accommodating chamber, said clutching arrangement comprising:
a lower clutch gear drivingly engaged with a drive gear, a stationary stub shaft mounted to said housing, said stationary stub shaft comprising a first shaft longitudinal axis, a first bearing positioned on said stationary stub shaft, said first bearing being mounted within said lower clutch gear, a first retainer ring securing said first bearing within said lower clutch gear, said first bearing being interposed between at least a portion of said lower clutch gear and said stub shaft, said lower clutch gear being rotatable around said first shaft longitudinal axis relative to said stationary stub shaft;
a clutch ring mounted to said housing, a floating shaft comprising a second shaft longitudinal axis and a flange, said floating shaft extending through said clutch ring, said floating shaft being capable of axial movement along said second shaft longitudinal axis relative to said clutch ring, a second bearing supported by said clutch ring, said second bearing being interposed between said clutch ring and a portion of said floating shaft, wherein said floating shaft does not overlap said stationary stub shaft in an axial direction parallel to the first shaft longitudinal axis;
an upper clutch gear drivingly engaged with a feed gear, a third bearing positioned within said upper clutch gear, said third bearing being interposed between a portion of said upper clutch gear and said floating shaft, a second retainer ring securing said third bearing within said upper clutch gear, said upper clutch gear being rotatable around said second shaft longitudinal axis relative to said floating shaft, said upper clutch gear being capable of movement along said second shaft longitudinal axis relative to said housing;

a spring positioned between said lower clutch gear and said upper clutch gear, said spring surrounding an upper portion of said stationary stub shaft and a lower portion of said floating shaft, said spring applying an upward spring force to said upper clutch gear, said upward spring force biasing said upper clutch gear away from said lower clutch gear;

a lower clutch gear tooth positioned on an upward-facing surface of said lower clutch gear, an upper clutch gear tooth positioned on a downward-facing surface of said upper clutch gear, said upper clutch gear being in an advance position when said lower clutch gear tooth engages said upper clutch gear tooth, whereby said upper clutch gear drives said feed gear;

a first clutch ring tooth positioned on a downward-facing surface of said clutch ring, a second clutch ring tooth positioned on an upward-facing surface of said upper clutch gear, said upper clutch gear being in a retract position when said first clutch ring tooth engages said second clutch ring tooth, whereby said upper clutch gear stops said feed gear.

10. The clutching arrangement of claim 9, wherein the lower clutch gear comprises a first surface and the upper clutch gear comprises a second surface, the first surface facing the second surface, the lower clutch gear tooth extending toward the second surface from the first surface and the upper clutch gear tooth extending toward the first surface from the second surface.

11. The clutching arrangement of claim 10, wherein the lower clutch gear tooth comprises a first contact surface and the upper clutch gear tooth comprises a second contact surface, the first contact surface extending at a non-perpendicular angle from the first contact surface and the second contact surface extending at a non-perpendicular angle from the second surface.

12. The clutching arrangement of claim 10, wherein the first surface and the second surface do not contact when the stationary stub shaft and the floating shaft contact.

13. The clutching arrangement of claim 9, wherein the upper clutch gear abuts the flange.

* * * * *